US006445936B1

(12) United States Patent
Cannon et al.

(10) Patent No.: US 6,445,936 B1
(45) Date of Patent: Sep. 3, 2002

(54) LOW POWER CONSUMPTION QUICK CHARGE FOR WIRELESS DEVICE

(75) Inventors: Joseph M. Cannon, Harleysville; Philip D. Mooney, North Wales; James C. Popa, Allentown, all of PA (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/441,078

(22) Filed: Nov. 16, 1999

(51) Int. Cl.[7] .................................................. H04Q 7/20
(52) U.S. Cl. ....................................... 455/573; 455/574
(58) Field of Search ............................... 455/403, 423, 455/13.4, 522, 573, 572, 574, 127, 343, 462; 320/113, 114, 115, 128, 149, FOR 120, 150

(56) References Cited

U.S. PATENT DOCUMENTS

| 4,511,761 A | * | 4/1985 | Yamazaki et al. | 379/413 |
|---|---|---|---|---|
| 4,731,813 A | * | 3/1988 | Schroeder | 455/410 |
| 4,775,827 A | * | 10/1988 | Ijntema et al. | 320/44 |
| 439,770 A | * | 7/1990 | Makino | 455/573 |
| 4,992,720 A | * | 2/1991 | Hata | 320/23 |
| 5,034,871 A | * | 7/1991 | Okamoto et al. | 363/15 |
| 5,036,532 A | * | 7/1991 | Metroka et al. | 455/127 |
| 5,142,563 A | * | 8/1992 | Nyuu et al. | 455/573 |
| 5,274,320 A | * | 12/1993 | Yamaguchi et al. | 320/31 |
| 5,371,784 A | * | 12/1994 | Yankura | 320/115 |
| 5,467,007 A | * | 11/1995 | Hyakutake | 320/22 |
| 5,619,568 A | * | 4/1997 | Miller | 455/566 |
| 5,677,944 A | * | 10/1997 | Yamamoto et al. | 455/38.3 |
| 5,835,852 A | * | 11/1998 | Bundgardt | 455/90 |
| 5,867,798 A | * | 2/1999 | Inukai et al. | 320/115 |
| 5,986,437 A | * | 11/1999 | Lee | 320/162 |
| 6,118,250 A | * | 9/2000 | Hutchison, IV et al. | 320/110 |
| 6,329,944 B1 | * | 12/2001 | Richardson et al. | 340/10.33 |

* cited by examiner

Primary Examiner—Dwayne Bost
Assistant Examiner—Jean A. Gelin
(74) Attorney, Agent, or Firm—William H. Bollman

(57) ABSTRACT

The current draw of a wireless device, e.g., a cordless telephone, is minimized for a cradled remote handset drawing power from an AC outlet. This allows a greater portion of the total current amperage provided by the AC to DC converter to be allowed to charge the battery in the remote unit, and reduces the overall maximum or peak value of the current draw of the wireless device. With an improved peak power budget, a smaller (and presumably less expensive) AC to DC adapter than otherwise necessary may be used to power the wireless device. In one aspect, sniff operations of the remote handset are disabled or otherwise suppressed while the remote handset is in the cradle of the base unit, e.g., receiving a quick charge or trickle charge to its battery. In a second aspect, sniff operations of the base unit are disabled or otherwise suppressed while the remote handset is in the cradle of the base unit. In a last aspect, the charging mode of the battery in the remote handset of a wireless device changes based on activity in the remote handset.

29 Claims, 5 Drawing Sheets

LOW POWER CONSUMPTION QUICK CHARGE FOR WIRELESS DEVICE

BACKGROUND OF THE INVENTION

1. Field of the Invention

This invention relates generally to wireless electronic devices, such as a cordless telephone. More particularly, it relates to a method and apparatus for reducing overall AC power requirements of a battery powered cordless device such as a cordless telephone.

2. Background of Related Art

Wireless devices have changed the way many people in the world live. Many homes today have at least one wireless device, a cordless telephone, a wireless keyboard, a wireless mouse, a digital personal assistant (PDA), a notebook computer, etc. A typical wireless device comprises a base unit which is powered from household AC current, and a remote unit in communication with the base unit and powered by a battery. Communications are generally provided by radio frequency (RF) transmissions between the base and remote units.

Typically, such devices charge the battery of the remote unit while the remote unit is cradled or otherwise mated with the base unit or other "home" device. Thus, the battery for a cordless telephone is charged whenever it is placed in its cradle in a base unit. Though a fully charged battery does not require much current to stay fully charged, a drained battery needs a fair amount of current to charge quickly.

Typically, an AC (alternating current) to DC (direct current) adapter is used to provide the necessary power conversion from the AC current of an AC household outlet (e.g., 120 volts, 60 Hz AC) to the base unit of the wireless device. Such an AC to DC adapter is chosen to be sufficiently powerful enough to provide sufficient current to power the base unit and the remote handset during their normal operations, as well as being sufficient to charge the remote handset.

Two general techniques exist for charging a typical rechargeable battery in a wireless device: trickle charge and quick charge. A trickle charge provides a small amount of trickle current (e.g., about 50 mA or less, depending upon the amount of trickle and the battery technology used in the particular application) to the battery to maintain a full charge in an already charged battery, or to slowly build up to a full charge in the rechargeable battery over a period of many hours (e.g., 8 to 15 hours or more). Today, many batteries are capable of charging with a much higher current. Using the higher current, some low batteries are capable of quick charging in, e.g., 60 minutes to 2 hours as opposed to the many, many hours typically required using a trickle charge.

FIG. 5 shows a conventional cordless telephone with an AC to DC adapter sized to sustain quick charge, remote handset operations, and base and remote sniff operations.

In particular, in FIG. 5, a remote handset 500 is cradled in a matching base unit 510. When the remote handset 500 is cradled in the base unit 510, the base unit 510 and remote handset 500 are together powered by an AC to DC adapter 525, which also provides the current to charge the battery 526 of the remote handset 500.

The remote handset 500 and the base unit 510 communicate with one another via the wireless link established between respective RF front ends. Thus, the remote handset 500 continues to periodically sniff the RF front end to detect a transmission from the base unit relating to, e.g., a ring signal or a page signal, and to periodically transmit a request for frequency synchronization information in a "link verify" process. Moreover, the base unit 510 continues to periodically sniff the RF front end to detect activation of the remote handset 500 while it is cradled, e.g., a "phone on" activation. Conventionally, this sniffing was not of concern while the remote handset 500 is cradled because it was not causing a drain on the battery 526 in the remote handset 500.

Charging the battery in the remote handset 500 at the same time that normal or other operations in the remote handset 500 are being performed increases the peak, maximum power requirements for the AC to DC adapter 525. For instance, the RF front end of both the remote handset 500 and base unit 510 are each periodically powered up to sense any incoming signal from the respective matching base unit 510 or remote handset 500, respectively. This periodic sensing is conventionally referred to as "sniffing" or a "sniff" operation, and requires a significant amount of current to power the RF receiver to receive any transmitted signal, and to power a codec to digitize the received signal for processing.

In a conventional sniff operation performed by a remote handset 500 of a wireless device such as a cordless telephone, the remote handset 500 powers up its RF receiver to sense if a ring signal or a paging signal is being transmitted by the matching base unit 510. If a signal intended for the particular remote handset 500 is received, the entire RF front end of the remote handset 500 powers up, as do other circuits necessary to respond to the received signal. Similarly, in a conventional sniff operation performed by the base unit 510 of a wireless device such as a cordless telephone, the base unit 510 powers up its RF receiver to sense if any activity has occurred at the remote handset 500, e.g., a "phone on" or similar signal. Usually, the base unit 510 is always sniffing (i.e., no sleep or low power time), meaning that the RF off time on the base may be very, very short or even non-existent.

Conventionally, power use is less of a concern in the base unit 510 because it typically receives its power directly from an AC outlet. However, sniff operations performed by the remote handset 500 and base unit 510 add to the size of the power budget of the overall wireless device.

To accommodate the increased size of the power budget due to the sniff operations of the remote handset 500 and/or the base unit 510, an AC to DC adapter 525 is conventionally selected to be of sufficient size capable of providing sufficient current for the worst case situation, e.g., the remote handset 500 and base unit 510 both operating, and the battery 526 in the remote handset 500 being low and receiving a quick charge. Thus, the AC to DC adapter 525 must be sufficiently powerful enough to run both the remote handset 500 and base unit 510 operations, as well as quick charge the battery 526 of the remote handset 500. However, generally speaking, the greater the current draw capability of the AC to DC adapter 525, the more costly and bigger the size of the AC to DC adapter 525 is, adding significant cost to the bill of materials for the wireless device.

Thus, there is a need for a method and apparatus for allowing a reduction in the power requirements of a wireless device, to allow a corresponding reduction in the size (and/or cost) of an AC to DC adapter to power and charge the wireless device, and to reduce the heat generation of the AC to DC adapter and associated power circuitry, allowing for smaller circuit boards and/or for smaller enclosures.

SUMMARY OF THE INVENTION

In accordance with the principles of the present invention, apparatus to suppress a sniff operation in a wireless device comprises a charge detector module to detect a presence of charge current from a charging unit of the wireless device to a battery of the wireless device. A sniff module has an enabled mode and a disabled mode. The sniff module is placed in the disabled mode when the charge current is detected.

A method of suppressing a sniff operation in a wireless device in accordance with another aspect of the present invention comprises detecting an electrical coupling between the wireless device and a charging unit. When the coupling is detected, a sniff operation in the wireless device is suppressed.

A method of suppressing a sniff operation in a wireless device in accordance with yet another aspect of the present invention comprises detecting a presence of a remote handset in a cradle of a base unit. When the remote handset is detected as present in the cradle, a sniff operation is suppressed in one of the remote handset and the base unit.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides various methods and techniques for minimizing the current draw of a wireless device, e.g., a cordless telephone, while the remote handset is in a quick charge mode. This minimization of current draw during a quick charge mode allows a greater portion of the total current amperage provided by the AC to DC converter to be allowed to charge the battery in the remote unit. Moreover, careful management of the power budget of a wireless device during a quick charge mode of the remote unit reduces the overall maximum or peak value of the current draw of the wireless device. With an improved peak power budget, a smaller (and presumably less expensive) AC to DC adapter than otherwise necessary may be used to power the wireless device.

In accordance with a first aspect of the present invention, sniff operations of the remote handset are disabled or otherwise suppressed while the remote handset is in the cradle of the base unit, e.g., receiving a quick charge to its battery. In a second aspect of the present invention, sniff operations of the base unit are disabled or otherwise suppressed while the remote handset is in the cradle of the base unit. In a last aspect of the present invention, the charging mode of the battery in the remote handset of a wireless device changes based on activity in the remote handset. For instance, the remote handset may switch from a quick charge to a trickle charge to allow an RF front end of the remote handset to be powered up while the remote handset remains cradled. Conventionally, a cradled remote handset uses power drawn directly from the AC outlet through the base unit, and thus peak power for a cradled remote handset had not been of concern. However, in accordance with the principles of this aspect of the present invention, by balancing the charge power with power used by components on the remote handset, the size and/or cost of the AC to DC adapter used by the wireless device (or power transformer, regulator, or other components in the base unit of the wireless device) can be minimized.

Figure 1:
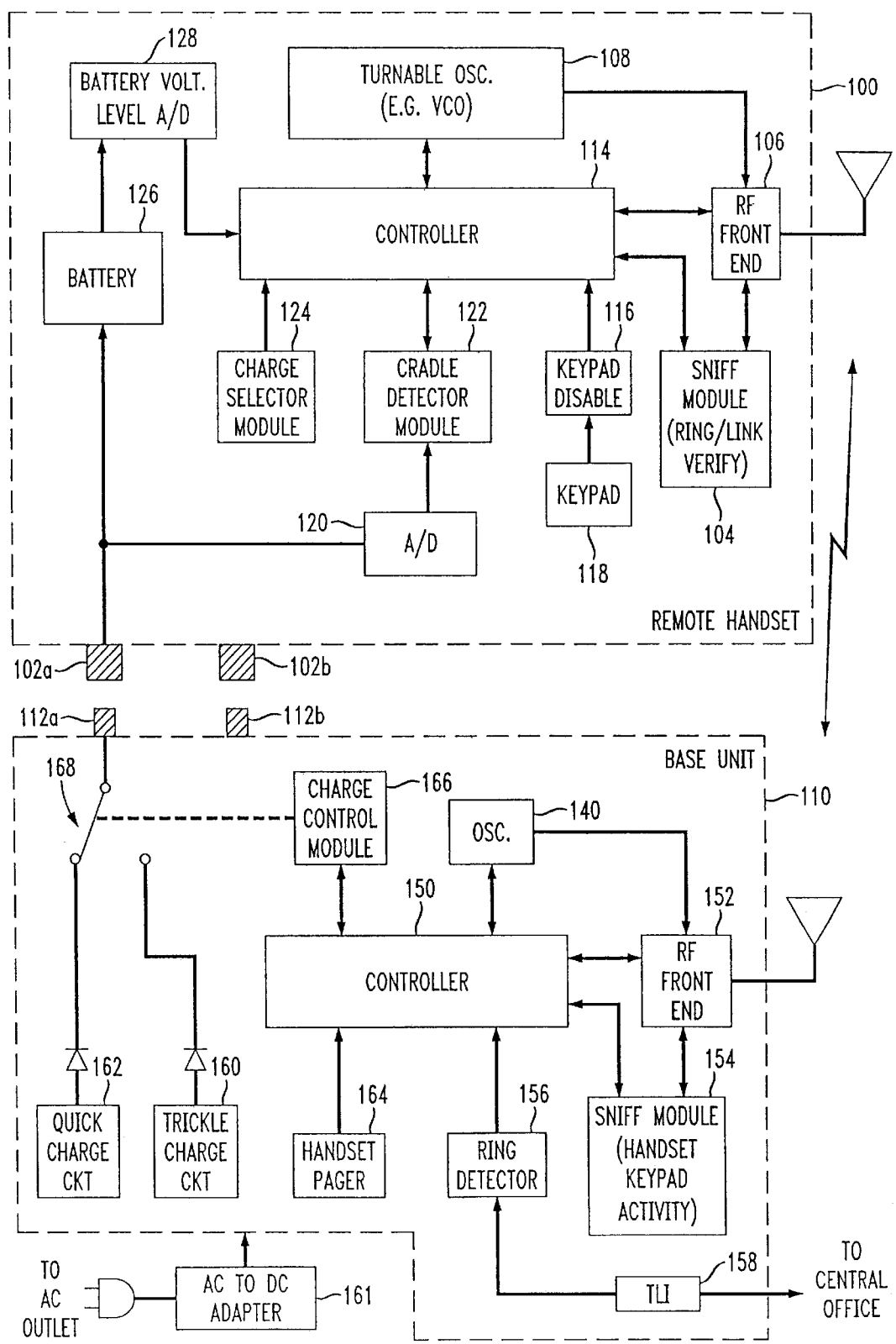
FIG. 1 shows a cordless telephone having suppressed RF front end power-ups for sniff operations while charging the battery in the remote handset, in accordance with the principles of the present invention.

FIG. 1 shows a wireless device such as a cordless telephone having suppressed RF front end power-ups for sniff operations while charging the battery in the remote handset, in accordance with the principles of the present invention.

In particular, in FIG. 1, a cordless telephone includes a base unit 110 and a wireless remote handset 100. The remote handset 100 generally communicates with the base unit 110 over a wireless interface between an RF front end 106 in the remote handset and a matching RF front end 152 in the base unit 1 10.

The remote handset 100 further includes a suitable controller 114 for controlling the overall operations of the remote handset 100. The controller 114 may be any appropriate processor for the ap plication, e.g., a microprocessor, a microcontroller, or a digital signal processor (DSP).

A rechargeable battery 126 in the remote handset 100 allows non-wired use of the remote handset 100. The battery 126 provides power to the components of the remote handset 100 when the remote handset 100 is not cradled in contact with the charge contacts 112a, 112b of the base unit 110. When the remote handset 100 is cradled in the base unit 110, power from the base unit (e.g., drawn from an AC household outlet) is provided to the remote handset 100 to both power operational components as well as to charge the battery.

When cradled in the base unit 110, the remote handset 100 includes charge contacts 102a, 102b which make physical contact with mating charge contacts 112a, 112b in the base unit 110. Of course, an inductive charge connection rather than a physical connection between the base unit 110 and the remote unit 100 is also within the principles of the present invention.

A charge selector module 124 in the remote handset 100 selects the desired charge mode for the battery 126, e.g., quick charge, trickle charge, and/or no charge or any of a multitude of charge levels in between a quick charge level and little (or no) charge. In the disclosed embodiment, the charge mode is selected based on the current charge level of the rechargeable battery 126, as determined by, e.g., the voltage level of the battery 126 measured by an appropriate battery voltage level analog-to-digital (A/D) converter 128.

The battery voltage level A/D converter 128 may have any number of discrete measurement levels. For instance, the A/D converter 128 may be a multiple bit A/D device provide a fine resolution in the measurement of the battery voltage. Alternatively, the battery voltage level A/D converter 128 may be as simple as a comparator with a reference voltage level, a quick charge being enabled if the current voltage of the battery is below a particular level and a trickle charge being enabled instead if the battery voltage is above the predetermined threshold level.

In accordance with the principles of the present invention, the remote handset 100 may be detected as being in the cradle of the base unit 110 in any appropriate manner, e.g., by the position of a physical switch hook. Alternatively, the cradle condition may be sensed and detected by measuring the charge power (e.g., current being supplied to the battery 126. For instance, an A/D converter 120 may be utilized across an appropriate resistor to sense a charge current. A suitable cradle detector module 122 determines the cradle/uncradled condition, and provides the information to the controller 114. Using this technique, if charge current is present, it is presumed that the remote handset 100 is cradled in the base unit 110. The cradle detector module 122 may be part of the program code for the controller 114, or may be a processor or circuit separate from the controller 114, but nevertheless preferably in communication with the controller 114.

The remote handset 100 may also include a tunable oscillator for use in tuning the frequency of the RF front end 106. In the disclosed embodiment, the tunable oscillator is matched to the frequency of an oscillator 140 in the base unit 110, e.g., using a periodic "link verify" communication between the remote handset 100 and the base unit 110. During this periodic link verify communication, initiated by the remote handset 100, frequency information is provided by the base unit 110 to the remote unit 100 for adjustment of the tunable oscillator 108 as necessary. While the oscillator 140 in the base unit 110 may be a tunable oscillator, the disclosed embodiment utilizes a fixed frequency oscillator 140 to reduce overall costs.

The link verify communication and oscillator adjustment allows synchronization of RF channel frequency as various affecting conditions arise, e.g., the remote handset being taken outside into a colder or warmer environment than the base unit which remains inside the house.

The remote handset 100 further includes a sniff module 104 to coordinate periodic power up of the receiver in the RF front end 106 and sensing for a transmission from the base unit 110. Importantly, in accordance with the principles of the present invention, the sniff module 104 is enabled for non-cradled operation of the remote handset 100, and is disabled when the remote handset 100 is cradled in the base unit 110.

The sniff module 104 may be comprised within the program code of the controller 114, or may be separate from the controller 114. If separate therefrom, the sniff module 104 is preferably in communication with the controller 114.

Because the sniff module 154 in the base unit 110 is disabled while the remote handset 100 is cradled, in accordance with this aspect of the present invention, otherwise conventional transmissions from the remote handset 100 indicating the occurrence of a keypress on a keypad 118 (e.g., a "phone on" keypress) will not be received while the sniff module 154 is disabled. Thus, in the disclosed embodiment it is preferred that the keypad 118 be disabled (e.g., using a keypad disable 116 activated by the controller 114 in response to the detection of the cradle condition by the cradle detector module 122), or made inaccessible to the user by designing the keypad so that it becomes face down or is otherwise physically blocked when the remote handset 100 is cradled in the base unit 110.

Figure 2:
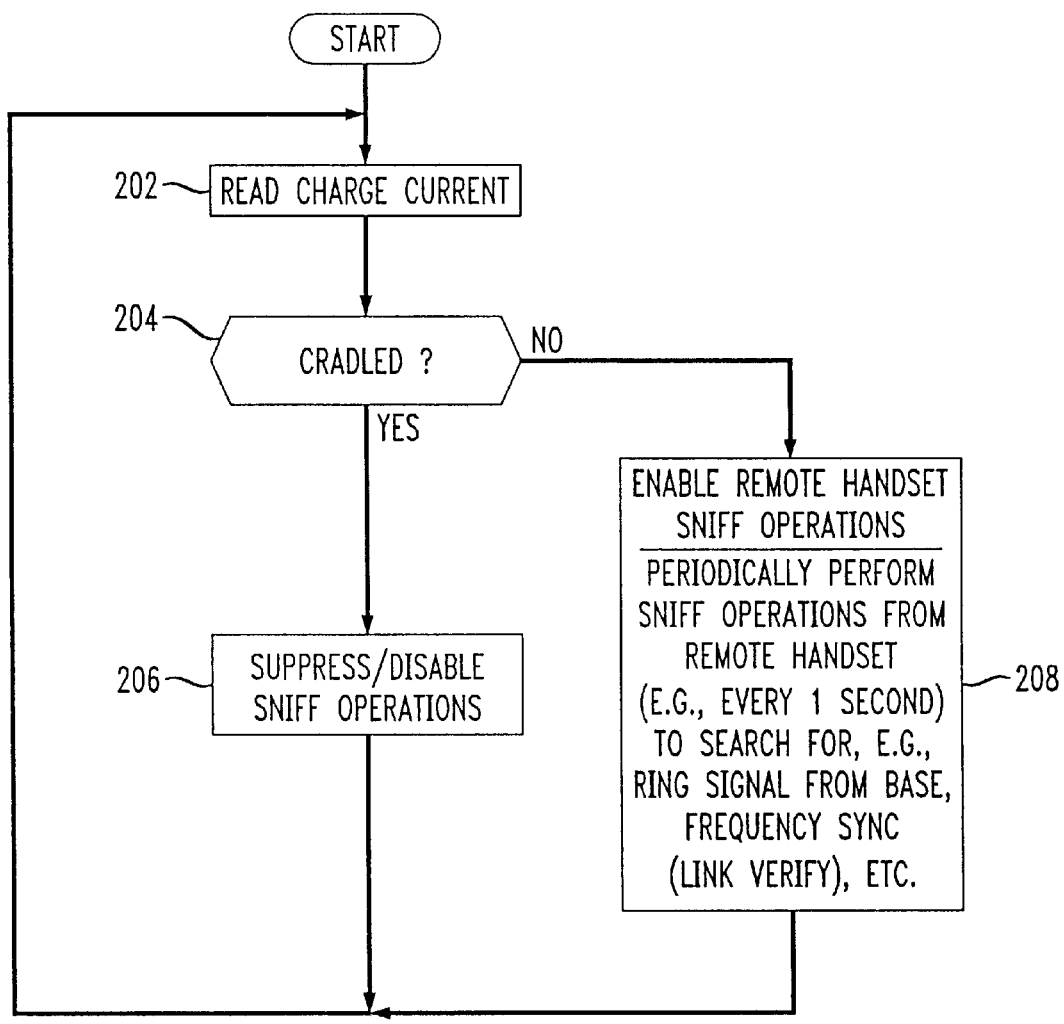
FIG. 2 shows an exemplary process for the remote handset shown in FIG. 1 to suppress or prevent a power up of the RF front end for a remote handset sniff operation (e.g., ring or page signal detect, or a link verify request to synchronize oscillator frequency with the base unit) while charging the battery of the remote handset, in accordance with the principles of the present invention.

FIG. 2 shows an exemplary process for the remote handset shown in FIG. 1 to suppress or prevent a power up of the RF front end 106 for a remote handset sniff operation (e.g., ring or page signal detect, or a link verify request to synchronize oscillator frequency with the base unit 110) while charging the battery 126 of the remote handset 100, in accordance with the principles of the present invention.

In particular, in FIG. 2, the cradled condition is periodically determined by the remote handset 100 by, e.g., reading a charge current as shown in step 202.

In step 204, the read charge current is characterized as indicating a cradled or uncradled condition.

If the remote handset 100 is not cradled as determined in step 204, then the sniff module 104 of the remote handset 100 is enabled to enable remote handset sniff operations. Thus, the remote handset 100 will be free to perform otherwise conventional periodic (e.g., every 1 second or so) sniff operations to detect a ring or page signal transmission from the base unit 110, and/or to transmit a link verify frequency synchronization signal to the base, and to receive a corresponding response from the base unit 110 regarding the current frequency of the oscillator 140 in the base unit 110.

However, in accordance with the principles of this aspect of the present invention, step 206 shows that if the remote handset 100 is determined by the cradle detector module 122 to be cradled, then the sniff module 104 in the remote handset 100 is disabled. When disabled, sniff operations such as sensing for a ring signal from the base unit 110, sensing for a page signal from the base unit 110, and/or link verify communications are prevented.

As shown in FIG. 2, the process returns to step 202 to again sense the cradle condition of the remote handset 100. When the remote handset 100 is uncradled, the sniff module 104 becomes enabled in step 208 and otherwise conventional sniff operations of the wireless device are resumed.

The base unit 110 further includes a suitable controller 150 to control the overall functions of the base unit 110. The controller 150 may be any appropriate processor, e.g., a microprocessor, a microcontroller, or a digital signal processor (DSP).

The base unit 110 is powered by an appropriate AC to DC adapter 161 which plugs into an AC outlet in the user's house or business. The DC power output from the AC to DC adapter 161 is provided to a power rail of the base unit 110 to supply the components therein. The DC power also provides the source or charge current to either a quick charge circuit 162, a trickle charge circuit 160, or other level of charge selected by communication from the remote handset 100. Based on the selected charge mode, a charge control module 166 is instructed by the controller 150 to provide the appropriate current (e.g., quick charge level) to the charge contacts 112a, 112b. This selection is depicted in FIG. 1 as a switch 168, although the selection may be performed by an enablement or disablement of the appropriate charge circuit 160, 162, or simply by adjusting a level of current supplied to the charge contacts 112a, 112b.

The base unit 110 includes a telephone line interface 158, although the principles of the present invention apply equally to a base unit which includes a wireless connection to a public switched telephone network or other network.

A ring detector 156 detects the presence of a ring signal from a central office on the telephone line, and provides the same to the controller 150 for communication to the remote handset 100. Similarly, a handset pager 164 (e.g., a button) may be provided which audibly signals the remote handset 100 when remote from the base unit 110.

Importantly, in accordance with this aspect of the present invention, the base unit 110 further includes a sniff module 154. The sniff module 154 may be part of a program in the controller 150, or may be separate therefrom but preferably in communication with the controller 150.

The sniff module 154 coordinates detection of transmissions from the remote handset 100, e.g., a signal indicating a "phone on" or other keypress.

When enabled, the sniff module 154 periodically powers up the receiver of the RF front end 152 to sense if a transmission is present from the remote handset 100. If not, the base unit, the base unit simply powers down the RF front end 152 until the next sniff period again powers the RF front end 152. On the other hand, if the base unit does sense a transmission from the remote handset 100 when the sniff is enabled such as a "phone on" keypress, the received signal is acted upon and appropriate circuits are powered to perform the desired function.

However, in accordance with the principles of the present invention, when the remote handset 100 is cradled, the base unit sniff module 154 is disabled to suppress or disable sniff operations (e.g., powering up of the RF front end 152 in the base unit 110) until the remote handset 100 is uncradled from the base unit 110.

Thus, while a remote handset of a conventional cordless telephone would normally be in low power, or "sleep" mode, waking up briefly every second or so to go into a receive only, or "sniff" mode to check for an incoming ring signal or page signal from its base unit, while the base unit would remain powered from the AC to DC adapter. However, in accordance with the principles of the present invention, overall peak power requirements are reduced by disabling or otherwise suppressing the sniff mode of a remote handset and/or the sniff mode of a base unit when the remote handset is cradled in the base unit.

Figure 3:
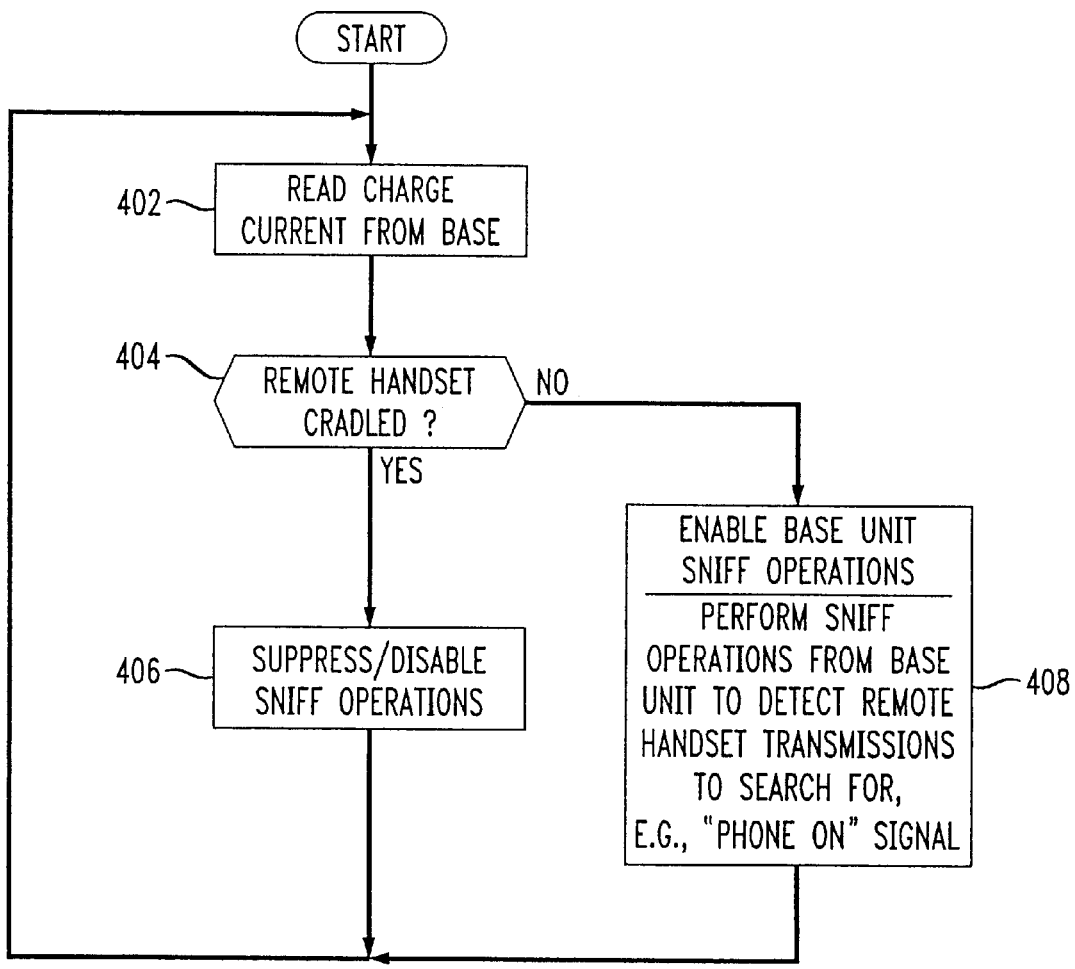
FIG. 3 shows an exemplary process for the base unit to suppress or prevent a power up of the RF front end for a base unit sniff operation (e.g., keypress signal detect) while charging the battery in the remote handset, in accordance with the principles of the present invention.

FIG. 3 shows an exemplary process for the base unit 110 to suppress or prevent a power up of the RF front end 152 for a base unit sniff operation (e.g., keypress signal detect) while charging the battery in the remote handset, in accordance with the principles of the present invention.

In particular, in FIG. 3, the base unit 110 determines whether or not the remote handset 100 is cradled. One technique for determining whether or not the remote handset 100 is cradled is to measure the charge current being provided to the remote handset 110, as shown in step 402, and determining whether or not the measured charge current corresponds to a cradled or uncradled remote handset 100, as shown in step 404.

If the base unit 110 is not cradled as determined in step 404, then the sniff module 154 of the base unit 110 is enabled to enable base unit sniff operations. Thus, the base unit 110 will be free to perform otherwise conventional sniff operations to detect a keypress signal transmission from the base unit 110, and/or a link verify frequency synchronization signal and to transmit a corresponding response regarding the current frequency of the oscillator 140 in the base unit 110.

However, in accordance with the principles of this aspect of the present invention, step 406 shows that if the base unit 110 is determined to not be cradled, then the base unit sniff module 154 is disabled. When disabled, base unit sniff operations such as sensing for a keypress signal or link verify signal from the remote handset 100, and/or transmitting link verify frequency synchronization information are prevented or otherwise suppressed.

As shown in FIG. 3, the process returns to step 402 to again sense the cradle condition of the remote handset 100.

When the remote handset 100 is uncradled, the base unit sniff module 154 becomes enabled in step 408 and otherwise conventional sniff operations of the base unit of the wireless device are resumed.

Thus, the base unit 110 is normally in a continuous "sniff" mode to sense a "phone on" or other command from the remote handset 100. However, in certain applications, limitations of the normal operations of the remote handset 100 while cradled (or particularly when receiving a quick charge) can reduce the overall power requirements of a typical wireless device such as a cordless telephone.

For instance, in such a situation, because the remote handset 100 is cradled during a quick charge, the base unit 110 would presumably not have to power up its RF front end 152. This is because the remote handset 100 is presumably incapable of sending a suitable command at that time.

To ensure non-operation of the remote handset 100 while cradled and receiving a quick charge, any appropriate design considerations may be implemented. For instance, the remote handset 100 may be placed face down in the base unit 110 making the operational buttons of the keypad 118 of the remote handset 100 inaccessible. Alternatively, or additionally, the keypad 118 of the remote handset 100 can be disabled while the remote handset 100 is in the cradle of the base unit 110.

Because the base unit 110 receives its ring detect signal internally, it need not power up its RF front end 152 while the remote handset 100 is cradled. This menial task can be performed using analog circuitry, or can be performed by a processor (e.g., a DSP) at a reduced clock speed (saving even more power).

Accordingly, although typically powered from an AC outlet, the peak power of even the base unit 110 can be reduced to provide additional savings in the overall peak current draw of the wireless device even while the remote handset 100 is cradled and in a quick charge mode.

Figure 4:
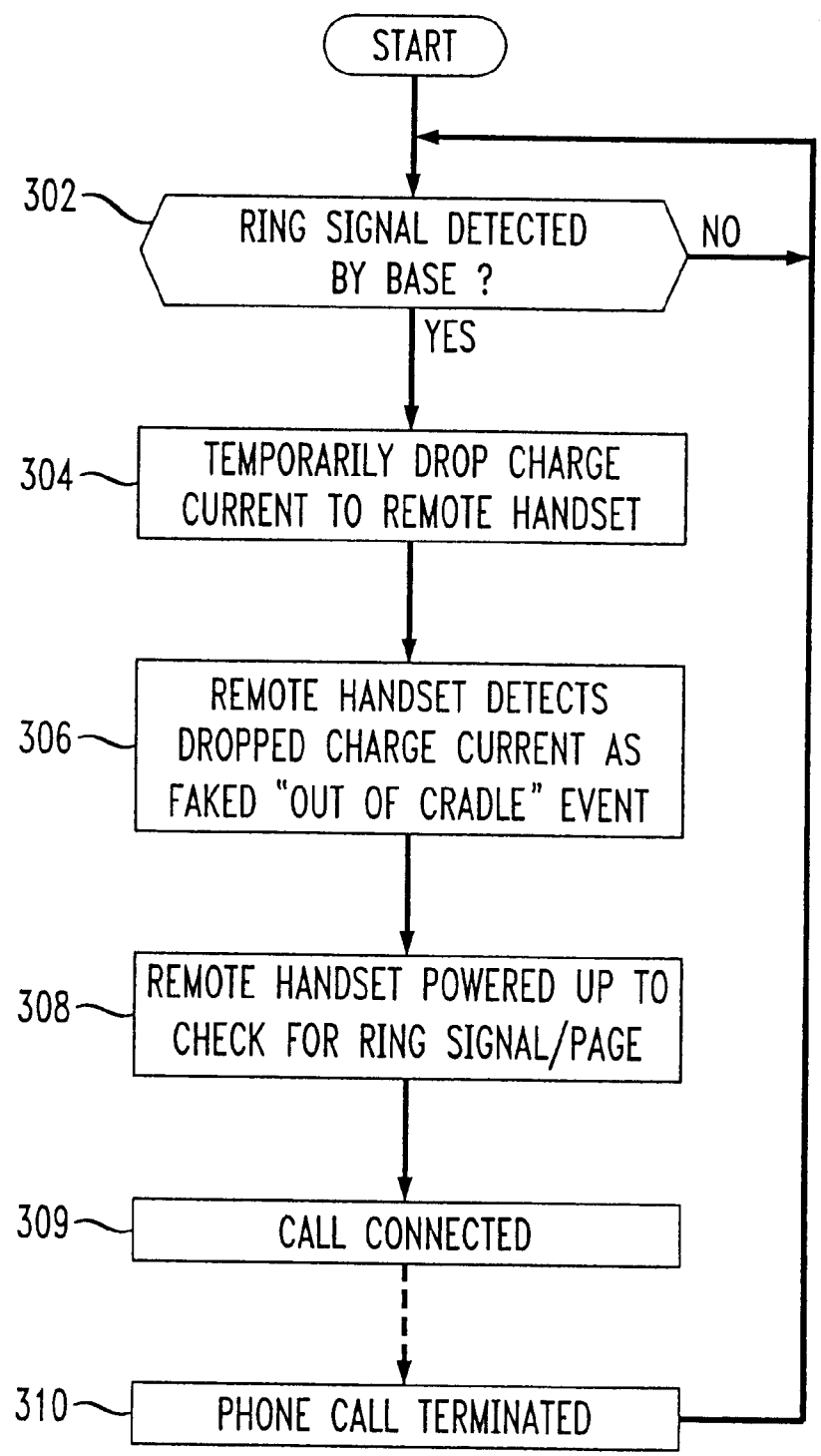
FIG. 4 shows an exemplary process of indicating a ring signal to the remote handset of FIG. 1 while sniff operations are disabled when the remote handset is cradled in the base unit, in accordance with the principles of the present invention.
Figure 5:
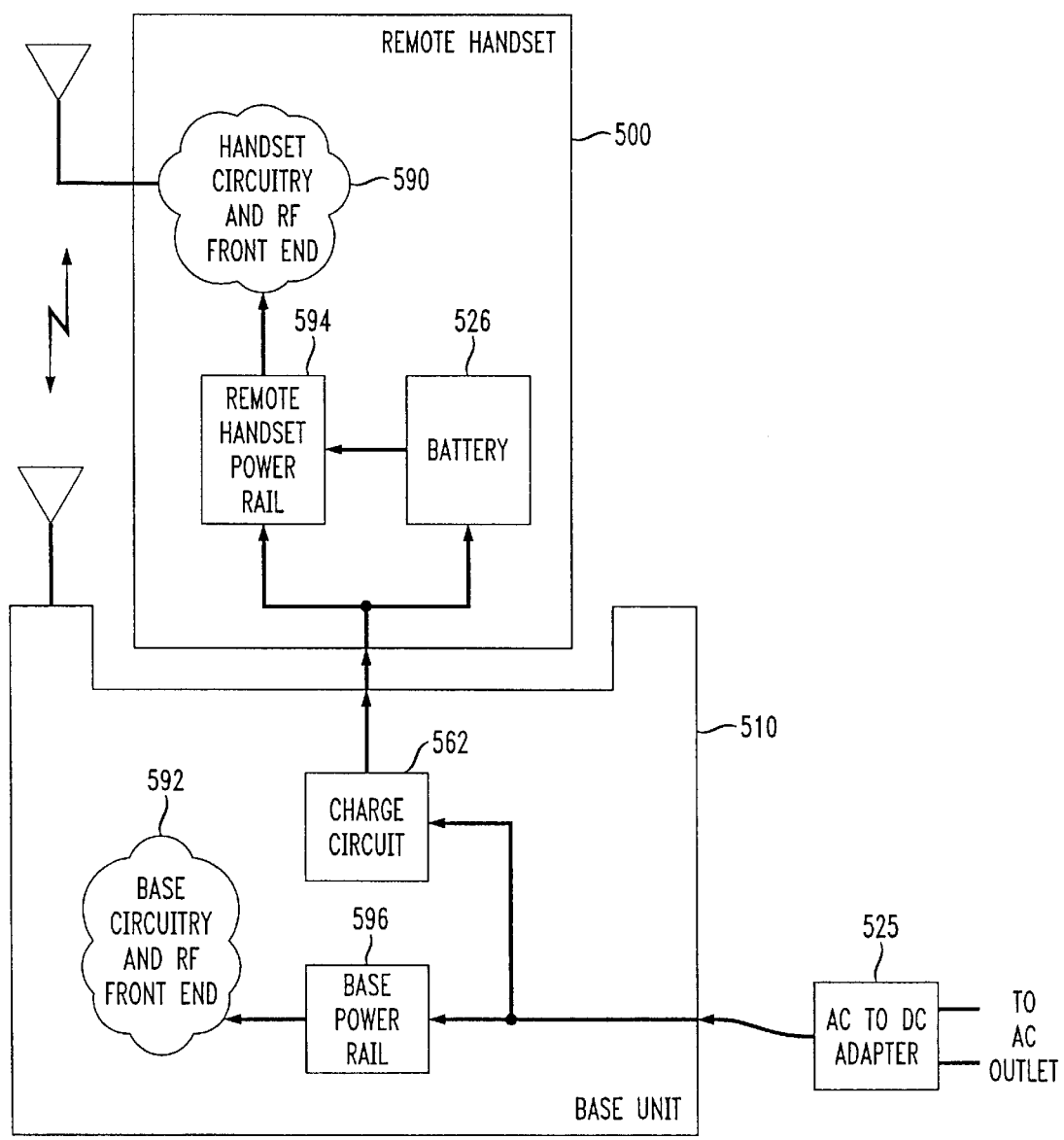
FIG. 5 shows a conventional cordless telephone with an AC to DC adapter sized to sustain quick charge, remote handset operations, and base and remote sniff operations.

FIG. 4 shows an exemplary process of indicating a ring signal to the remote handset of FIG. 1 while sniff operations are disabled when the remote handset is cradled in the base unit, in accordance with the principles of the present invention.

According to this aspect of the present invention, the base unit utilizes a separate communication path during quick charging. In particular, in recognition of the contact between the remote unit and its base unit during a quick charge operation, a communication path can be established using the cradle charge contacts between the remote unit and its base unit to indicate an appropriate power up condition (e.g., an incoming telephone call, a page signal, etc.) without the need for either remote handset sniff operations or base unit sniff operations.

In particular, in FIG. 4, a ring signal is detected by the ring detector 156 of the base unit 110 in step 302.

In step 304, the charge current to the remote handset 100 is temporarily dropped. For instance, the charge control module 166 may cause a selection of no-charge to the cradled remote handset 100.

In step 306, the remote handset detects the dropped charge current using, e.g., the A/D converter 120 across an appropriate small resistor in series with the charge loop. This dropped charge current is interpreted by the remote handset 100 as an "out of cradle" event, which re-enables sniff operations in the remote handset 100 leading to a full power operation of the remote handset 100 as shown by step 308 upon detection of the transmitted ring signal from the base unit 110.

After processing of the ring signal and subsequent call establishment, the processing eventually terminates as shown in step 310, and the process of FIG. 4 returns to wait for another ring signal to be detected.

Thus, rather than frequently having the remote handset power up certain components, e.g., its codec and RF front end, the remote handset can read the cradle contacts, e.g., on its internal, low power consumption, clock. When the base unit detects a ring signal on the telephone line, the base unit can signal the remote unit by dropping the charge current to the remote unit for, e.g., a second or so. The remote handset would detect the simulated "out of cradle" event caused by the drop in charge current, and power up or exit its sleep or standby mode to "sniff" for a ring or page signal in an otherwise conventional fashion.

By avoiding frequent power up of the codec, RF front end, and/or other components in the remote handset while it is in a quick charge, the remote handset will consume significantly less current, allowing a further reduction in the required current capability of the AC to DC adapter.

This power saving technique can actually improve the ring response time of a cordless telephone when the handset is in its cradle since the cradle detection can be performed much more frequently than the RF based sniff operation.

To additionally reduce the peak power budget of a wireless device, the charging mode of the remote handset 100 can be changed (e.g., from a quick charge mode to a trickle mode) during wireless operations, e.g., use of the remote handset 100 while cradled in the base unit 110 (if the remote handset 100 is allowed to operate while cradled).

For instance, when the remote handset 100 is required to power up additional circuitry and/or increase the clock speed of the controller 114 to perform necessary processing, the remote handset 100 can be set to trickle charge the battery 126 when it would otherwise be charging the battery 126 in a quick charge mode. Thus, a balance can be made between use of a power budget at any one time either by the controller 114 and other operational circuitry, and the charging method used to charge the battery 126 during that time.

When the controller 114 is powered up and performing significant processing, the charge current to the battery 126 can be throttled back to a trickle charge, and then when the processing is completed and a lower power mode is otherwise entered, the battery 126 can again be charged using a more powerful quick charge technique. This , reduces the peak or maximum amount of current draw necessary by the wireless device at any one time, allowing a smaller AC to DC adapter to be utilized.

Of course, placement of the battery 126 in a trickle charge mode at a time when it would otherwise require quick charging will increase the overall time required to fully charge the battery. However, the increase in overall charge time will be negligible, particularly in applications where the processing is significantly shorter in overall duration than the charging time.

The principles of the present invention provide a lower cost system (i.e., AC to DC adapter) for a wireless device while maintaining the speed advantages of a quick charging battery. Alternatively, additional current can be allocated to quick charging the battery for a comparatively same sized AC to DC adapter as in an otherwise conventional wireless device.

While a number of power saving techniques and apparatus are shown and described herein, any one of the disclosed techniques may allow a reduction in the peak current draw of the wireless device, allowing a smaller, more reliable and less expensive AC to DC adapter to be implemented.

Although the exemplary embodiment described above is a cordless telephone system, the present invention may be practiced in any wireless system in which two or more wireless devices require synchronization of respective clocks, and in which contact is at least occasionally provided between the wireless devices.

While in the exemplary embodiment described above the charge signal from the base unit 110 is described as being transmitted through physical charge contacts 102a, 102b on a remote handset 100 and matching charge contacts 112a, 112b on its base unit 110, it would be within the contemplation and the scope of the present invention to inductively provide a charge signal from the selected charge circuit 160, 162 of the base unit 110 to the remote handset 100.

While the invention has been described with reference to the exemplary embodiments thereof, those skilled in the art will be able to make various modifications to the described embodiments of the invention without departing from the true spirit and scope of the invention.

What is claimed is:

1. Apparatus to suppress a sniff operation in a wireless device, comprising:

a charge detector module to detect a presence of charge current from a charging unit of said wireless device to a battery of said wireless device; and a sniff module having an enabled mode and a disabled mode, said sniff module being placed in said disabled mode when said charge current is detected.

2. The apparatus to suppress a sniff operation in a wireless device according to claim 1, wherein:

said sniff module periodically powers up an RF receiver when in said enabled mode.

3. The apparatus to suppress a sniff operation in a wireless device according to claim 1, wherein:

said charging unit is associated with a base unit of said wireless device.

4. The apparatus to suppress a sniff operation in a wireless device according to claim 3, wherein:

said sniff module is located in said base unit.

5. The apparatus to suppress a sniff operation in a wireless device according to claim 3, wherein:

said sniff module is located in said remote handset.

6. The apparatus to suppress a sniff operation in a wireless device according to claim 1, wherein:

said wireless device is a cordless telephone handset.

7. A method of suppressing a sniff operation in a wireless device, comprising:

detecting an electrical coupling between said wireless device and a charging unit; and when said coupling is detected, suppressing a sniff operation in said wireless device.

8. The method of suppressing a sniff operation in a wireless device according to claim 7, wherein:

said wireless device is a wireless handset which otherwise detects a signal transmitted from a matching base unit when said sniff operation is not suppressed.

9. The method of suppressing a sniff operation in a wireless device according to claim 7, wherein:

said suppressed sniff operation includes a suppression of a power-up of an RF receiver of said wireless device.

10. The method of suppressing a sniff operation in a wireless device according to claim 7, wherein:

said presence of said coupling is detected by measuring an output level of a charge current to said wireless device.

11. The method of suppressing a sniff operation in a wireless device according to claim 10, wherein:

said measured output level is a measured charge current to said wireless device.

12. The method of suppressing a sniff operation in a wireless device according to claim 7, wherein:

said wireless device is a cordless telephone handset.

13. A method of suppressing a sniff operation in a wireless device, comprising:

detecting a presence of a remote handset in a cradle of a base unit; and when said remote handset is detected as present in said cradle, suppressing a sniff operation in one of said remote handset and said base unit.

14. The method of suppressing a sniff operation in a wireless device according to claim 13, wherein:

said suppression is performed in said remote handset.

15. The method of suppressing a sniff operation in a wireless device according to claim 13, wherein:

said suppression is performed in said base unit.

16. The method of suppressing a sniff operation in a wireless device according to claim 13, wherein:

said suppressed sniff operation includes a suppression of a power-up of an RF receiver in said base unit.

17. The method of suppressing a sniff operation in a wireless device according to claim 13, wherein:

said presence of said remote handset is detected by measuring an output level of a charge current provided by said base unit to said remote handset.

18. The method of suppressing a sniff operation in a wireless device according to claim 13, wherein:

said measured output level is a measured charge current provided by said base unit to said remote handset.

19. The method of suppressing a sniff operation in a wireless device according to claim 13, wherein:

said wireless device is a cordless telephone.

20. Apparatus for suppressing a sniff operation in a wireless device, comprising:

means for detecting an electrical coupling between said wireless device and a charging unit; and means for suppressing a sniff operation in said wireless device when said coupling is detected as present in said cradle.

21. The apparatus for suppressing a sniff operation in a wireless device according to claim 20, wherein:

said suppressed sniff operation includes a suppression of a power-up of an RF receiver of said wireless device.

22. The apparatus for suppressing a sniff operation in a wireless device according to claim 20, wherein:

said means for detecting detects said presence of said coupling by measuring an output level of a charge current to said wireless device.

23. The apparatus for suppressing a sniff operation in a wireless device according to claim 22, wherein:

said measured output level is a measured charge current to said wireless device.

24. The apparatus for suppressing a sniff operation in a wireless device according to claim 22, wherein:

said wireless device is a cordless telephone handset.

25. Apparatus for suppressing a sniff operation in a wireless device, comprising:

means for detecting a presence of a remote handset in a cradle of a base unit; and means for suppressing a sniff operation in one of said remote handset and said base unit when said remote handset is detected as present in said cradle.

26. The apparatus for suppressing a sniff operation in a wireless device according to claim 25, wherein:

said suppressed sniff operation includes a suppression of a power-up of an RF receiver in said base unit.

27. The apparatus for suppressing a sniff operation in a wireless device according to claim 25, wherein:

said means for detecting detects said presence of said remote handset by measuring an output level of a charge current provided by said base unit to said remote handset.

28. The apparatus for suppressing a sniff operation in a wireless device according to claim 27, wherein:

said measured output level is a measured charge current provided by said base unit to said remote handset.

29. The apparatus for suppressing a sniff operation in a wireless device according to claim 25, wherein:

said wireless device is a cordless telephone.

\* \* \* \* \*